UNITED STATES PATENT OFFICE.

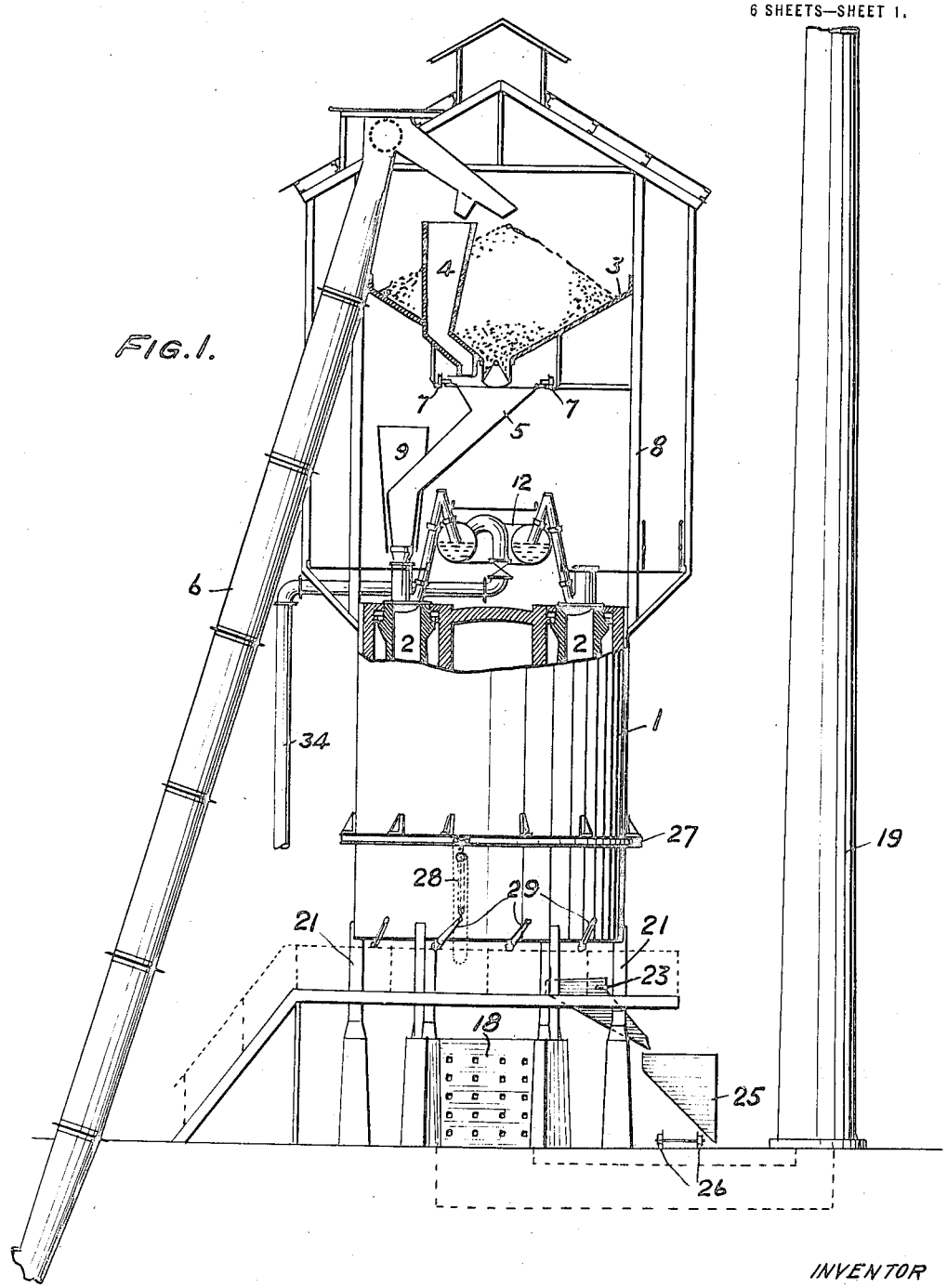

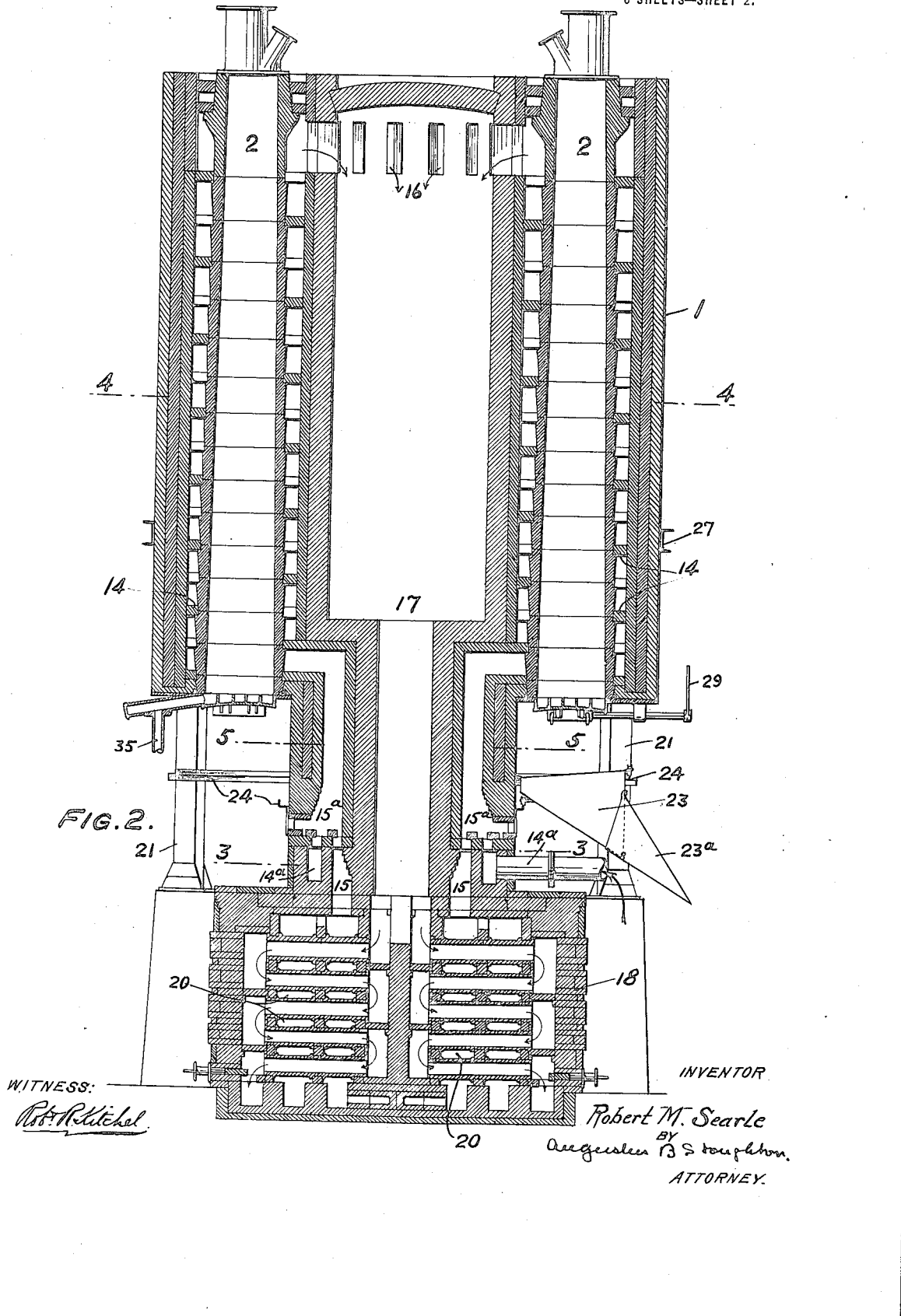

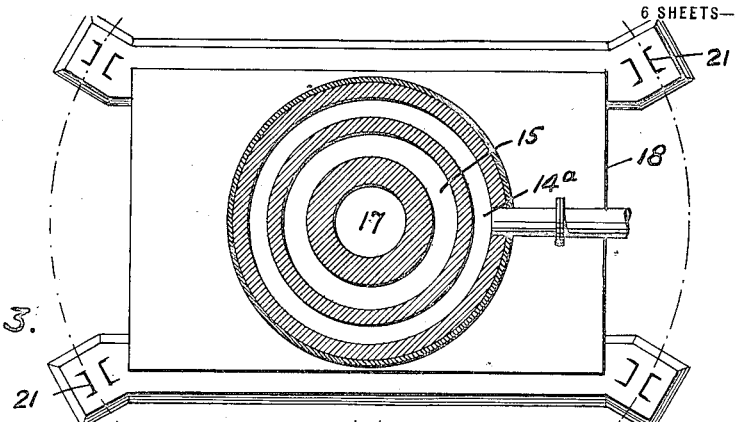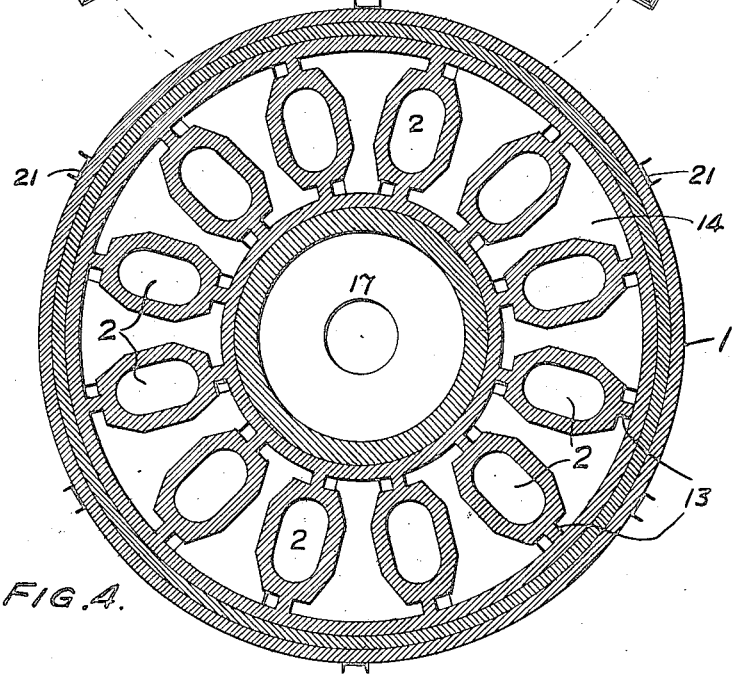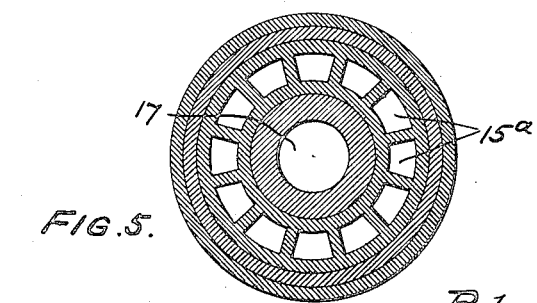

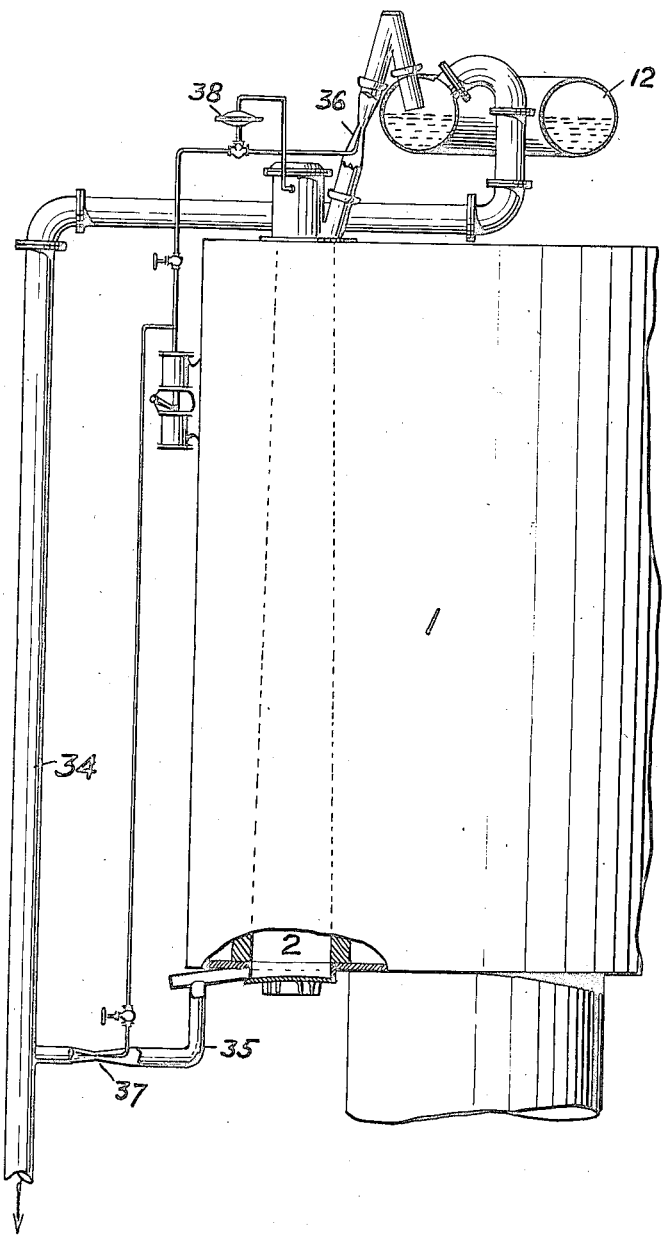
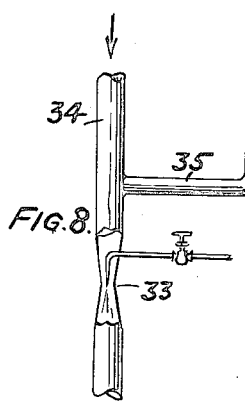

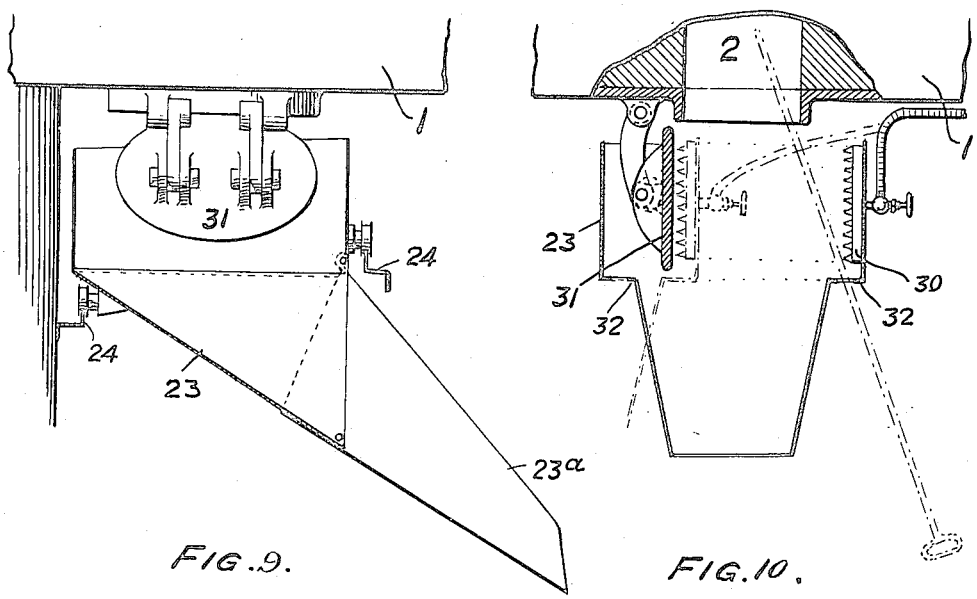
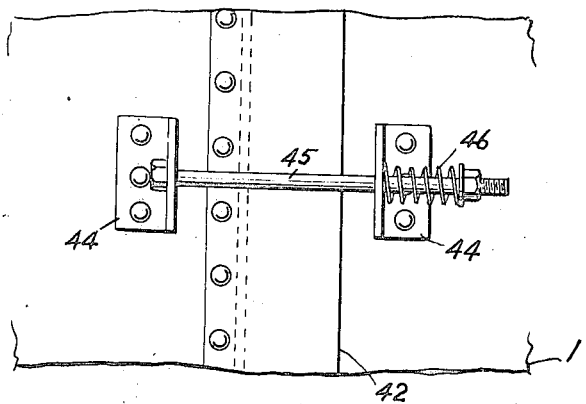
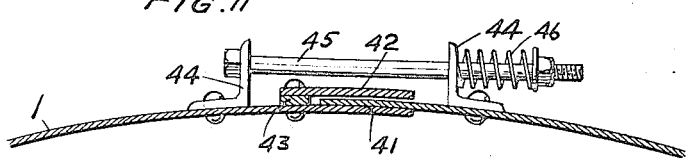

ROBERT M. SEARLE, OF ROCHESTER, NEW YORK, ASSIGNOR TO THE U. G. I. CONTRACTING COMPANY, OF PHILADELPHIA, PENNSYLVANIA, A CORPORATION OF DELAWARE.

VERTICAL-RETORT GAS-MAKING APPARATUS.

1,427,078.   Specification of Letters Patent.   Patented Aug. 22, 1922.

Application filed September 23, 1919. Serial No. 325,631.

*To all whom it may concern:*

Be it known that I, ROBERT M. SEARLE, a citizen of the United States, residing at Rochester, in the county of Monroe and State of New York, have invented certain new and useful Improvements in Vertical-Retort Gas-Making Apparatus, of which the following is a specification.

Fundamentally the present invention consists in a change of form and construction of the setting of vertical retort gas making apparatus and by means of such changes introducing and embodying new modes of operation or functions and attaining new and useful results and important advantages.

Briefly the changes of form and construction consist principally in the provision of flues and chambers and sub-divisions thereof along with controls by which the application and control of heat to the retort is improved. These changes also bring about improvements in operation and benefit operating and working conditions, and improve the product and its production, as will be hereinafter more fully described and finally pointed out in the claims.

In describing the invention reference will be made to the accompanying drawings forming part hereof and in which Figure 1, is a side view, partly in section, of one embodiment of the invention.

Fig. 2, is a transverse sectional view drawn to an enlarged scale and illustrating the lower portion of the setting shown in Fig. 1.

Figs. 3, 4 and 5, are sectional views drawn to an enlarged scale and taken respectively upon the lines 3—3, 4—4, and 5—5 of Fig. 2.

Fig. 7, is a view of a part of the setting illustrating further advantages thereof.

Fig. 8, is a detail view drawn to an enlarged scale and illustrating a modification of the arrangement shown in Fig. 7.

Figs. 9 and 10, are sectional side and front views illustrative of further advantages of the invention and showing a coke discharge, and Figs. 11 and 12, are elevational and horizontal cross-sectional views drawn to an enlarged scale and illustrating features of construction.

Figure 6:
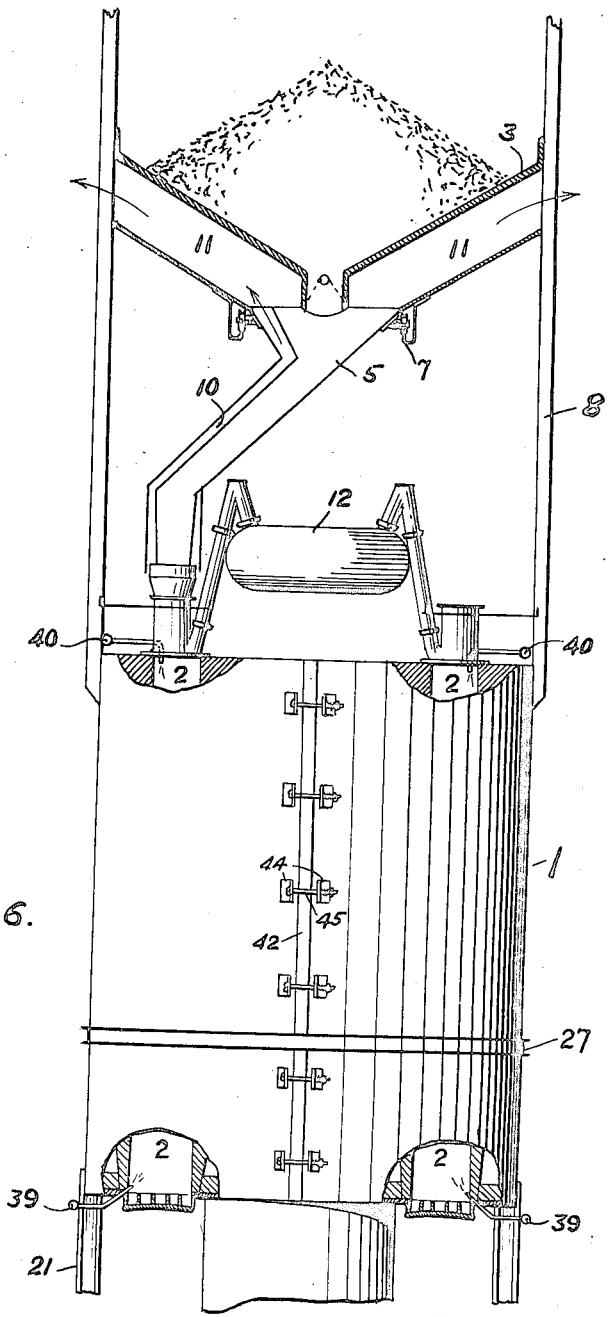
Fig. 6, is a view partly in section, illustrating advantages of the setting and showing a modification of the ventilation means.

In the drawings the setting is enclosed in a cylindrical shell 1, as of metal, and the vertical retorts 2, are arranged in a circle. A pyramid and a polygon of many sides possess many of the same advantages. The form and structure referred to possess many advantages which will appear from the following description. The hopper 3, with or without a breeze pocket 4, is stationary and by providing it with a spout 5, turnable about a generally central axis, each of the retorts can be charged by the simple operation of turning the spout and without moving the hopper or transporting its contents. 6, indicates a conveyer for charging the hopper and its pocket. As shown the spout 5, is carried by wheels which run on a circular track 7, carried by the framework 8, of the superstructure. Ventilation is provided through the superstructure when the retorts are charged. In Fig. 1, this is accomplished by the tube section 9, and in Fig. 6, by the sub-division 10, of the spout 5, and the vents 11, formed beneath the hopper. In the latter case the dust is carried and discharged outside of the super-structure which benefits the conditions of operation.

The dip-pipe off-take 12, may be annular in plan, and it is shown as arranged centrally of the structure and when this is done room is afforded for the spout to move around. The retort chamber is ring shaped in plan and may be radially sub-divided by partitions, as at 13, Fig. 4, thus providing in effect an independent chamber between each two adjoining retorts and this provides in effect for heating each vertical retort of the series as a unit and for attaining an accurate control of temperature. Each of the sub-divisions of the retort chamber is shown as provided with baffle-plates 14, which operate to distribute the heat to the best advantage.

Gaseous fuel admitted at 14$^a$, meeting heated air delivered through passage 15, burns in the sub-divided combustion chamber 15$^a$, Figs. 2 and 5, and in the sub-divided chamber containing the retorts and supplies the necessary heat for externally heating the retorts. Products of combustion leaving the sub-divisions of the retort chamber by ports 16, descend through a passage or chamber 17, at the center of the setting and traversing the heat exchanger 18, escape by the stack 19. Air passes through the flues 20, and is heated by the exchanger 18, in the usual manner. At the discharge or lower ends of the retorts the diameter of the setting is contracted to provide space for a discharge chute 23, arranged to travel on a circular track 24. This chute 23, discharges clear of all of the iron work into a coke car 25 (Fig. 1) also adapted to travel on a circular track 26. By this arrangement, which is an advantage of the described setting, there is always provided ample room for the chute and also the car both of which can be readily pushed out of the way. 27, is a circular track upon which a chain or other hoist 28, is arranged to travel so that it can be used for operating the levers 29, of the retort bottoms. The chute 23, may be provided with an air blast 30, Figs. 9 and 10, and by proper movement of the chute on its circular track this air blast 30, can be applied to and removed from the inner face of the bottom lid 31, of the retorts, in order to clean them and insure their tight fitting when the bottom doors are closed. By offsetting and perforating the bottom of the chute as indicated at 32, a hand-bar may be used for starting the discharge of the retorts without danger of any of the discharge reaching the operator of the bar. The chute 23, is shown as provided with a hinged section 23ª which can be turned up to avoid the columns. One exhauster 33, Fig. 8, operated by steam or appropriate fluid, may be provided for the common off-take pipe 34, from the dip seal 12, and for the bottom off-take connections 35, from the lower portions of the retorts. However, separate exhausters 36 and 37, Fig. 7, may be provided for the top and bottom of each retort, and the exhausters 36, may be controlled by automatic pressure regulators 38, responsive to the pressure in the individual retorts. By controlling the pressure or exhaust at the top and bottom ends of individual retorts it is possible to maintain in each retort pressure conditions, desired or required, for producing gas under conditions favorable for economy, quality and by-product production. In the interest of economy and increased production water gas may be made from the incandescent coke in all or some of the externally heated vertical retorts towards the end of the gas making period and before re-charging and for this purpose steam and oil connections 39 and 40, are shown near the bottom and top of the externally heated retorts in Fig. 6, and when this is done the carbureted water gas may be collected along with the coal gas.

From the foregoing description it will appear that the setting is mechanically strong and that when properly constructed to work efficiently and without leakage it will continue to operate in that way for a long time, due to its cylindrical form. The cylindrical form obviates the use of buck-stays and permits of the employment of a metal enclosing shell so that the structure resists temperature changes. There are economies and advantages in operation such as the distribution of the charge from a fixed hopper to the various retorts, the convenient discharge of the coke from all the retorts into the same car, the operation of all the retort bottoms by a single hoist, and these are made possible by the described cylindrical form of setting and they reduce and simplify the labor required. The described cylindrical setting is compact and therefore need occupy comparatively little ground space. Other features of advantage have been mentioned in or will be understood from the foregoing description, among which is the fact that the retorts are straight.

The metal shell 1, which encircles the brickwork is shown as provided with an expansion joint, Figs. 11 and 12. The joint consists of a lap 41, over which is arranged a cover strip 42, mounted on a filling piece 43, and riveted or otherwise secured to the shell, and of tension members shown as consisting or ears 44, riveted to the shell on opposite sides of the lap and connected by a bolt 45, between the nut of one of which and one ear is interposed a compression spring 46. The devices just described are one embodiment of means for keeping a constant pressure on the brickwork.

Obvious modifications may be made in details of construction and arrangement without departing from the spirit of the invention which is not limited in respect to such matters or otherwise than as the prior state of the art and the appended claims may require.

I claim:

1. Vertical retort gas making apparatus comprising in combination, a brickwork setting of cylindrical form, vertical retorts arranged therein, a metal shell surrounding the setting, and spring means tending to contract the shell to keep constant pressure on the brickwork, substantially as described.

2. Vertical retort gas making apparatus comprising in combination a setting having a hollow cylindrical super-structure embodying a retort chamber, an annular row of straight vertical retorts arranged in said chamber, radial partitions sub-dividing said chamber into independent retort chambers, an air heater arranged at the base of the super-structure and communicating with the retort chamber through the hollow core of the cylindrical structure, and a sub-divided combustion chamber between the air heater and the retort chamber and the sub-divisions of which communicate with the sub-divisions of the retort chamber, whereby the heating of the retorts is controlled individually, substantially, as described.

3. In a vertical retort gas making apparatus the combination of an annular retort chamber, a ring of straight retorts arranged in the chamber and each provided with vertical partitions extending to the inner and outer walls of said chamber and dividing it into a series of independent retort chambers, a combustion chamber sub-divided into a series of combustion chambers communicating with the chambers of the series of retort chambers, and means for regulating combustion in the chambers, substantially as described.

4. In a vertical retort gas making apparatus the combination of an annular retort chamber, a ring of straight retorts arranged in the chamber and each provided with vertical partitions extending to the inner and outer walls of said chamber and dividing it into a series of independent retort chambers, a combustion chamber sub-divided into a series of combustion chambers communicating with the chambers of the series of retort chambers, means for regulating combustion in the chambers, and horizontal baffle plates in each of the retort chambers, substantially as described.

ROBERT M. SEARLE.